(12) United States Patent
Yoshida (10) Patent No.: US 12,547,094 B2
(45) Date of Patent: Feb. 10, 2026

(54) OPTICAL SCANNER AND IMAGE FORMING APPARATUS INCLUDING THE SAME

(71) Applicant: KYOCERA Document Solutions Inc., Osaka (JP)

(72) Inventor: Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 152 days.

(21) Appl. No.: 18/598,519

(22) Filed: Mar. 7, 2024

(65) Prior Publication Data

US 2024/0310749 A1    Sep. 19, 2024

(30) Foreign Application Priority Data

Mar. 17, 2023 (JP) ................. 2023-042596

(51) Int. Cl.
| | | |
|---|---|---|
| *G02B 26/10* | (2006.01) | |
| *G02B 7/02* | (2021.01) | |
| *G02B 26/08* | (2006.01) | |
| *G02B 26/12* | (2006.01) | |
| *G03G 15/04* | (2006.01) | |
| *G03G 15/043* | (2006.01) | |

(52) U.S. Cl.
CPC ......... *G03G 15/0435* (2013.01); *G02B 7/021* (2013.01); *G02B 26/0875* (2013.01); *G02B 26/10* (2013.01); *G02B 26/122* (2013.01); *G02B 26/125* (2013.01); *G03G 15/04* (2013.01); *G03G 15/04072* (2013.01)

(58) Field of Classification Search
CPC ......... G03G 15/0435; G03G 15/04072; G03G 15/04; G02B 26/122; G02B 26/125; G02B 26/0875; G02B 7/021; G02B 26/10
See application file for complete search history.

(56) References Cited

U.S. PATENT DOCUMENTS

| | | | |
|---|---|---|---|
| 2010/0189480 A1* | 7/2010 | Hanano | G03G 21/007 399/349 |
| 2014/0267529 A1* | 9/2014 | Otoguro | G03G 13/04 359/205.1 |
| 2015/0002594 A1 | 1/2015 | Ishidate et al. | 347/118 |

FOREIGN PATENT DOCUMENTS

JP    2015-011064 A    1/2015

* cited by examiner

*Primary Examiner* — Yaovi M Ameh
(74) *Attorney, Agent, or Firm* — Stein IP, LLC (57) ABSTRACT

An optical scanner includes a scanning optical system, a housing, and a pressing and retaining member. The housing includes a retaining portion, a support portion that is formed to be opposed to the retaining portion, and an engaged portion to be engaged with an engaging portion. The pressing and retaining member includes a main body including the engaging portion and at least one pressing portion. In a first state where the engaging portion is engaged with the engaged portion, the at least one pressing portion presses the optical element toward the retaining portion. While the pressing and retaining member shifts from a second state where the engaging portion is not engaged with the engaged portion to the first state, a distal end of the at least one pressing portion passes beyond a boundary between the retaining portion and the optical element and abuts on a part of the housing.

5 Claims, 6 Drawing Sheets

OPTICAL SCANNER AND IMAGE FORMING APPARATUS INCLUDING THE SAME

INCORPORATION BY REFERENCE

This application is based upon and claims the benefit of priority from the corresponding Japanese Patent Application No. 2023-042596 (filed on Mar. 17, 2023), the entire contents of which are incorporated herein by reference.

BACKGROUND

The present disclosure relates to an optical scanner that forms a latent image on a scanning target surface by exposure scanning and an image forming apparatus including the same, such as a copy machine, a printer, a facsimile, or a multi-functional peripheral equipped with functions of these apparatuses.

Conventionally, in an optical scanner used in an image forming apparatus, a light beam emitted from a light source such as a laser diode passes through a collimator lens, a cylindrical lens, and an aperture to become incident on a deflector such as a polygon mirror so as to be deflected, and then passes through a scanning lens to be guided to a photosensitive drum (an image carrier) where the light beam is used for exposure scanning on a surface of the photosensitive drum so that an electrostatic latent image is formed thereon.

Furthermore, in a case where the light beam that has passed through the scanning lens cannot be directly guided to the photosensitive drum due to limitations on a layout of the image forming apparatus, generally adopted is a configuration in which a folding mirror is used to reflect the light beam. Typically, a pressing and retaining member such as a leaf spring is used to press a reflection surface of the folding mirror against a seating surface formed in a housing of the optical scanner so that positioning and securing of the folding mirror are achieved.

SUMMARY

An optical scanner according to an aspect of the present disclosure includes a scanning optical system, a housing, and a pressing and retaining member and exposes to light a surface of an image carrier so as to form thereon an electrostatic latent image with attenuated electrostatic charge. The scanning optical system scans a light beam and guides the light beam onto the image carrier. The housing includes a retaining portion that retains an optical element as a component of the scanning optical system. The pressing and retaining member presses the optical element so as to retain the optical element to the retaining portion. The pressing and retaining member includes a main body and a pressing portion that is connected to the main body and presses the optical element retained to the retaining portion toward the retaining portion. The housing includes a support portion that is formed to be opposed to the retaining portion and supports the main body and an engaged portion to be engaged with an engaging portion formed in the main body. In a first state where the pressing and retaining member is inserted between the retaining portion and the support portion so that the engaging portion is engaged with the engaged portion, the pressing portion presses the optical element toward the retaining portion. While the pressing and retaining member shifts from a second state where the engaging portion is not engaged with the engaged portion to the first state, a distal end of the pressing portion passes beyond a boundary between the retaining portion and the optical element and abuts on a part of the housing.

DETAILED DESCRIPTION

Figure 1:
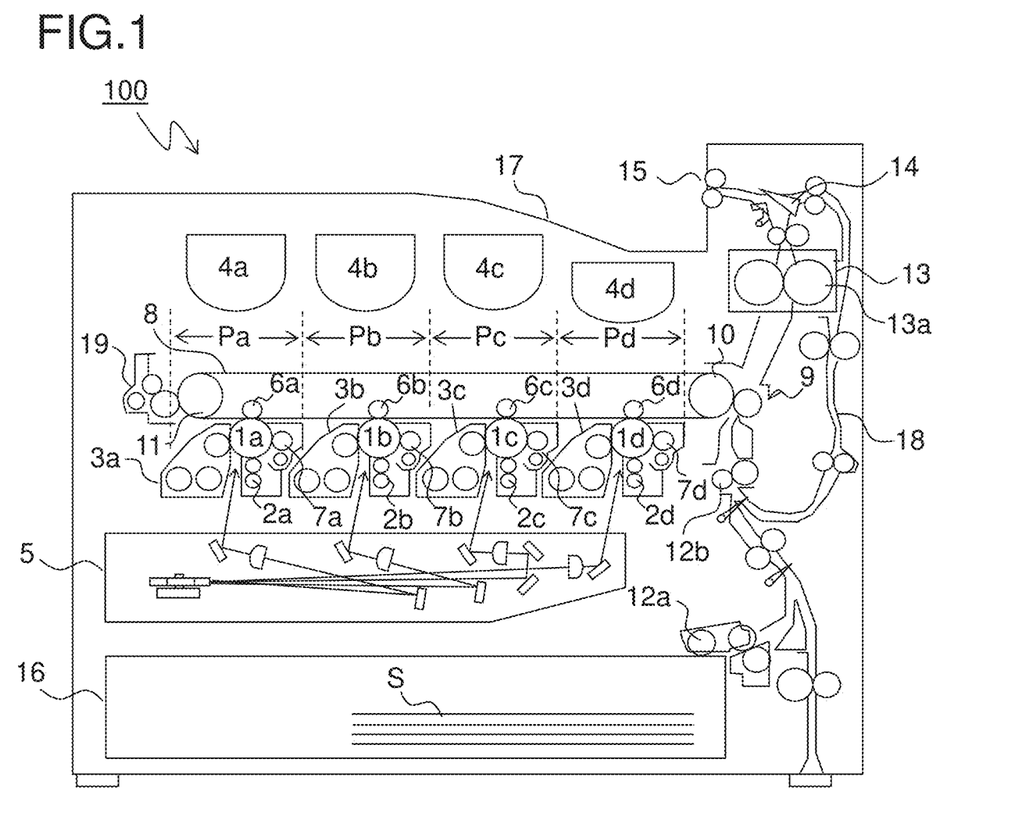
FIG. 1 is a schematic sectional view showing an overall configuration of an image forming apparatus in which an optical scanner of the present disclosure is mounted.
Figure 2:
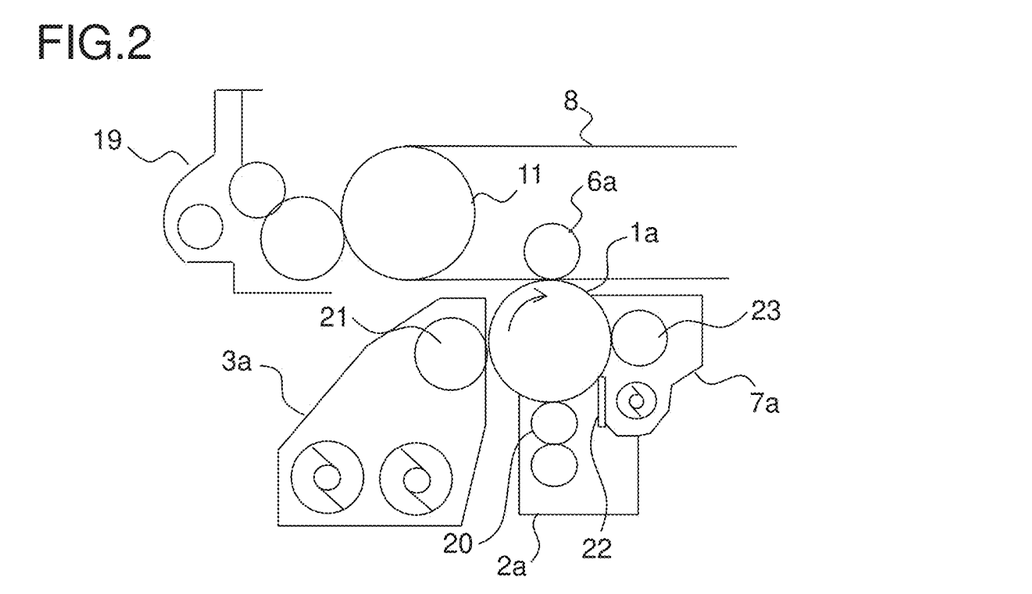
FIG. 2 is an enlarged view of a vicinity of an image forming portion shown in FIG. 1.

The following describes embodiments of the present disclosure with reference to the appended drawings. FIG. 1 is a schematic sectional view showing an overall configuration of an image forming apparatus 100 in which an optical scanner 5 of the present disclosure is mounted. FIG. 2 is an enlarged view of a vicinity of an image forming portion Pa shown in FIG. 1.

The image forming apparatus 100 shown in FIG. 1 is a so-called tandem color printer and has a configuration described below. That is, in a main body of the image forming apparatus 100, four image forming portions Pa, Pb, Pc, and Pd are arranged in order from upstream in a conveyance direction (a left side in FIG. 1). The image forming portions Pa to Pd are provided so as to correspond to images of four different colors (magenta, cyan, yellow, and black) and sequentially form images of magenta, cyan, yellow, and black, respectively, by individually performing steps of charging, exposure, development, and transfer.

In the image forming portions Pa to Pd, photosensitive drums 1a, 1b, 1c, and 1d are arranged, respectively, to carry visible images (toner images) of the respective colors. Moreover, an intermediate transfer belt 8 that rotates in a counterclockwise direction in FIG. 1 is provided adjacently to the image forming portions Pa to Pd. Toner images formed respectively on the photosensitive drums 1a to 1d are sequentially transferred on the intermediate transfer belt 8 moving while abutting on the photosensitive drums 1a to 1d and then are transferred collectively on a sheet S as an example of a recording medium in a secondary transfer unit 9. Moreover, the toner images are fixed on the sheet S in a fixing portion 13, and then the sheet S is discharged from the main body of the image forming apparatus 100. An image forming process with respect to the photosensitive drums 1a to 1d is executed while the photosensitive drums 1a to 1d are rotated in a clockwise direction in FIG. 1.

The sheet S on which the toner images are to be transferred is contained in a sheet cassette 16 provided in a lower part of the main body of the image forming apparatus 100 and is conveyed to the secondary transfer unit 9 via a paper feed roller 12a and a registration roller pair 12b. A seam-free (seamless) belt is mainly used as the intermediate transfer belt 8.

Next, a description is given of the image forming portions Pa to Pd. While the following describes the image forming portion Pa in detail, the image forming portions Pb to Pd are also basically similar in configuration to the image forming portion Pa, and duplicate descriptions thereof, therefore, are omitted. As shown in FIG. 2, around the photosensitive drum 1a, a charging device 2a, a developing device 3a, and a cleaning device 7a are arranged along a drum rotation direction (a clockwise direction in FIG. 2), and a primary transfer roller 6a is disposed to face the photosensitive drum 1a via the intermediate transfer belt 8. Furthermore, a belt cleaning unit 19 is disposed upstream from the photosensitive drum 1a in a rotation direction of the intermediate transfer belt 8 so as to be opposed to a tension roller 11 via the intermediate transfer belt 8.

Next, a description is given of an image forming procedure performed in the image forming apparatus 100. Upon an input of a user's instruction to start image formation, first, the photosensitive drums 1a to 1d are started to rotate by a main motor (not shown), and surfaces of the photosensitive drums 1a to 1d are each uniformly charged by a charging roller 20 of a corresponding one of the charging devices 2a to 2d. Then, a light beam (a laser light beam) emitted from the optical scanner 5 is applied to the surfaces of the photosensitive drums 1a to 1d so that electrostatic latent images corresponding to an image signal are formed on the photosensitive drums 1a to 1d.

The developing devices 3a to 3d are filled with prescribed amounts of toners of the respective colors of magenta, cyan, yellow, and black, respectively. In a case where a percentage of the toners in two-component developers filled in the developing devices 3a to 3d falls below a preset value due to after-mentioned toner image formation, the developing devices 3a to 3d are replenished with fresh supplies of toners from toner containers 4a to 4d, respectively. The toners in the developers are supplied onto the photosensitive drums 1a to 1d each by a developing roller 21 of a corresponding one of the developing devices 3a to 3d and electrostatically adhere thereto. Thus, there are formed toner images corresponding to the electrostatic latent images formed by exposure from the optical scanner 5.

Further, by the primary transfer rollers 6a to 6d, an electric field is applied at a prescribed transfer voltage between themselves and the photosensitive drums 1a to 1d, respectively, and thus the toner images of magenta, cyan, yellow, and black on the photosensitive drums 1a to 1d are primarily transferred on the intermediate transfer belt 8. These images of the four different colors are formed in a prescribed positional relationship previously determined for prescribed full-color image formation. After that, residual toners remaining on the surfaces of the photosensitive drums 1a to 1d are removed each by a cleaning blade 22 and a rubbing roller 23 of a corresponding one of the cleaning devices 7a to 7d in preparation for subsequent formation of new electrostatic latent images.

As a driving roller 10 is driven to rotate by a belt drive motor (not shown), the intermediate transfer belt 8 starts to rotate in the counterclockwise direction, and then the sheet S is conveyed at a prescribed timing from the registration roller pair 12b to the secondary transfer unit 9 provided adjacently to the intermediate transfer belt 8, in which a toner image is transferred thereon. The sheet S on which the toner images have been transferred is conveyed to the fixing portion 13. A residual toner remaining on a surface of the intermediate transfer belt 8 is removed by the belt cleaning unit 19.

The sheet S conveyed to the fixing portion 13 is subjected to heat and pressure by a fixing roller pair 13a, and thus the toner images are fixed on a surface of the sheet S to form a prescribed full-color image thereon. A conveyance direction of the sheet S on which the full-color image has been formed is controlled by a branch portion 14 branching off in a plurality of directions, and the sheet S is directly (or after being conveyed to a duplex conveyance path 18 and thus subjected to duplex printing) discharged to a discharge tray 17 by a discharge roller pair 15.

Figure 3:
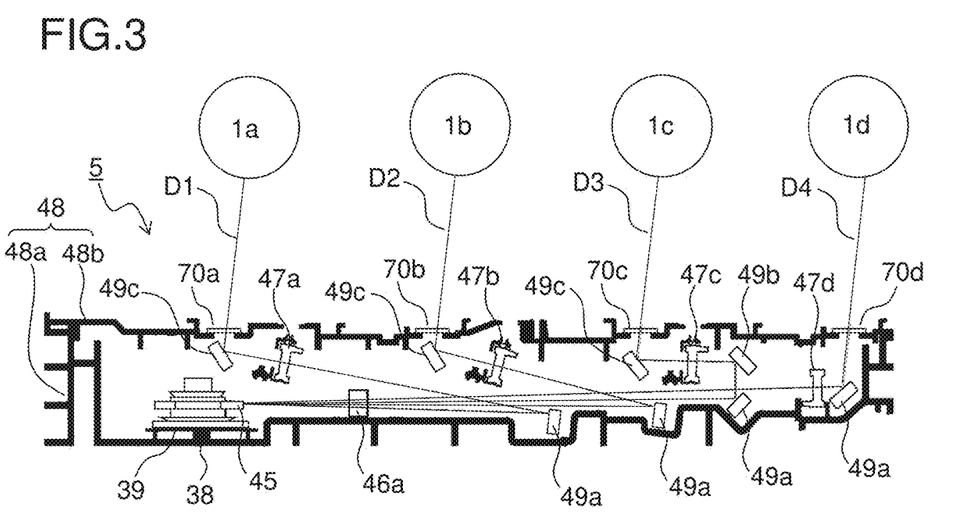
FIG. 3 is a sectional side view showing an internal structure of an optical scanner according to an embodiment of the present disclosure.

Next, a description is given of the optical scanner 5. FIG. 3 is a sectional side view showing an internal configuration of an optical scanner 5 according to an embodiment of the present disclosure. As shown in FIG. 3, the optical scanner 5 includes a housing 48. The housing 48 includes a main body 48a and a lid 48b. A polygon mirror 45 is disposed on a bottom surface of the main body 48a. In this embodiment, the polygon mirror 45 is formed of a rotary polyhedral mirror having a regular polygonal shape, with a plurality of deflection surfaces (reflection surfaces) formed on side surfaces thereof, and is driven to rotate at a prescribed speed by a polygon motor 38. The polygon motor 38 is secured to a motor support plate 39 that is secured to the bottom surface of the main body 48a.

In the housing 48, there are disposed a laser light source, a collimator lens, an aperture, a cylindrical lens (none of which are shown), a first scanning lens 46a, second scanning lenses 47a to 47d, and plane mirrors 49a to 49c. The first scanning lens 46a and each of the second scanning lenses 47a to 47d have an fe characteristic and thus form an image of a corresponding one of laser light beams D1 to D4 deflected and reflected by the polygon mirror 45 on a corresponding one of the photosensitive drums 1a to 1d. Furthermore, the plane mirrors 49a to 49c are disposed on optical paths of the laser light beams D1 to D4 extending from the polygon mirror 45 to the photosensitive drums 1a to 1d.

A description is given of an operation of scanning the laser light beams D1 and D2 performed by the optical scanner 5 configured as above. First, the laser light beams D1 and D2 emitted from the laser light source are made into substantially parallel light fluxes by the collimator lens and are adjusted to have a prescribed optical path width by the aperture. Next, the laser light beams D1 and D2 thus made into the substantially parallel light fluxes are made incident on the cylindrical lens. The laser light beams D1 and D2 thus made incident on the cylindrical lens are emitted directly as the parallel light fluxes in a main scanning cross section and in a converged state in a sub-scanning direction and are formed into linear images on the deflection surfaces of the polygon mirror 45. At this time, in order to facilitate separation of the optical paths of the two laser light beams D1 and D2 deflected by the polygon mirror 45, the laser light beams D1 and D2 are configured to become incident on the deflection surfaces at different angles from each other in the sub-scanning direction.

The laser light beams D1 and D2 made incident on the polygon mirror 45 are deflected by the polygon mirror 45 at a constant angular velocity and then are deflected by the first scanning lens 46a at a constant velocity. The laser light beams D1 and D2 that have passed through the first scanning lens 46a are folded by corresponding ones of the plane mirrors 49a disposed respectively on the optical paths thereof, and the laser light beam D1 becomes incident on the second scanning lens 47a so as to be deflected thereby at a constant velocity, while the laser light beam D2 becomes incident on the second scanning lens 47b so as to be deflected thereby at a constant velocity. Further, the laser light beams D1 and D2 thus deflected at a constant velocity are folded by corresponding ones of the plane mirrors 49c as most downstream mirrors disposed respectively on the optical paths thereof and pass through windows 70a and 70b, respectively, which are formed in the lid 48b covering an opening of the main body 48a, so as to be distributed to the photosensitive drums 1a and 1b, respectively.

In a similar manner, after passing through the collimator lens, the aperture, and the cylindrical lens, the laser light beams D3 and D4 emitted from the laser light source are also deflected by the polygon mirror 45 at a constant angle velocity and deflected by the first scanning lens 46a at a constant velocity. The laser light beam D3 that has passed through the first scanning lens 46a is folded twice by a corresponding one of the plane mirrors 49a and the plane mirror 49b disposed on the optical path thereof and then becomes incident on the second scanning lens 47c so as to be deflected at a constant velocity, while the laser light beam D4 that has passed through the first scanning lens 46a becomes incident on the second scanning lens 47d so as to be deflected at a constant velocity. Moreover, the laser light beam D3 is folded by a corresponding one of the plane mirrors 49c as a most downstream mirror, while the laser light beam D4 is folded by a corresponding one of the plane mirrors 49a, and the laser light beams D3 and D4 pass through windows 70c and 70d formed in the lid 48b, respectively, so as to be distributed to the photosensitive drums 1c and 1d, respectively.

The polygon mirror 45, the first scanning lens 46a, the second scanning lenses 47a to 47d, and the plane mirrors 49a to 49c constitute a scanning optical system that scans the laser light beams D1 to D4 and guides them onto the photosensitive drums 1a to 1d, respectively.

Figure 4:
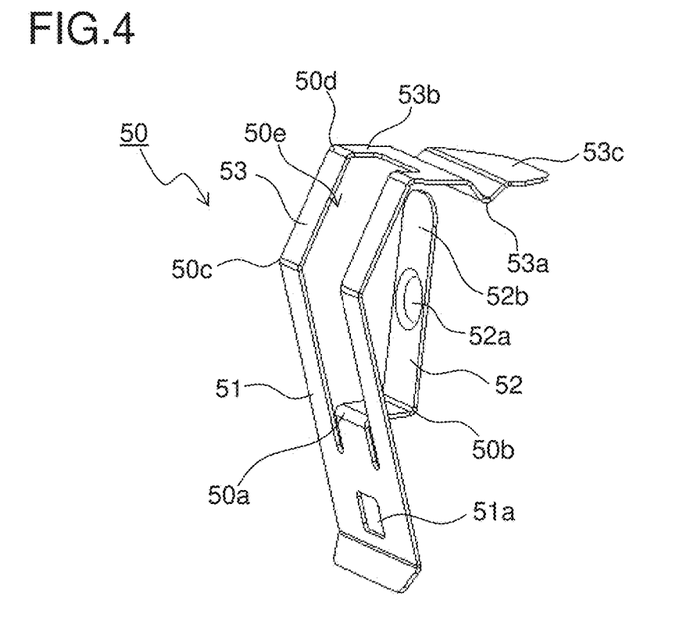
FIG. 4 is a perspective view of a pressing spring for pressing and retaining a first scanning lens in a housing of an optical scanner according to a first embodiment of the present disclosure.

FIG. 4 is a perspective view of a pressing spring 50 (a pressing and retaining member) for pressing and retaining a first scanning lens 46a in a housing 48 of an optical scanner 5 according to a first embodiment of the present disclosure. The pressing spring 50 is formed by bending a metal plate and includes a spring main body 51, a first pressing portion 52 and a second pressing portion 53.

The spring main body 51 is supported to a spring support portion 61 (see FIG. 5 and FIG. 6) of the housing 48. The spring main body 51 has an engaging hole 51a (an engaging portion) formed at a lower end thereof. The engaging hole 51a engages with an engaged portion 60d (see FIG. 6) of a lens retaining portion 60.

The first pressing portion 52 is bent from the spring main body 51 at a first bent part 50a above the engaging hole 51a and is further bent at a second bent part 50b in a direction inverse to a direction of bending at the first bent part 50a, thus being formed in an L shape as viewed sideways. The first pressing portion 52 is connected to the spring main body 51 so as to be elastically deformable, with the first bent part 50a serving as a fulcrum of bending. A first pressure contact point 52a having a hemispherical shape is formed substantially at a center of the first pressing portion 52 in a longitudinal direction thereof. The first pressing portion 52 includes an extension 52b formed of a distal end (upper) part thereof beyond the first pressure contact point 52a extending toward the second pressing portion 53.

The second pressing portion 53 is bent from the spring main body 51 at a third bent part 50c at an upper end of the spring main body 51 and extends in the same direction as an extending direction of the first pressing portion 52. The second pressing portion 53 is bent in an inverted V shape as viewed sideways at a fourth bent part 50d. The second pressing portion 53 is connected to the spring main body 51 so as to be elastically deformable, with the third bent part 50c serving as a fulcrum of bending. A second pressure contact point 53a having a V shape as viewed sideways is formed in a distal end part of the second pressing portion 53. The second pressing portion 53 includes a proximal end 53b closer to the spring main body 51 than the second pressure contact point 53a and an extension 53c closer to a distal end thereof than the second pressure contact point 53a. The proximal end 53b and the extension 53c are flush with each other.

The pressing spring 50 has a slit 50e formed to extend in an up-down direction from the first bent part 50a to a neighborhood of the second pressure contact point 53a via the third bent part 50c and the fourth bent part 50d. The slit 50e is formed by cutting and raising the first pressing portion 52 from the spring main body 51.

Figure 5:
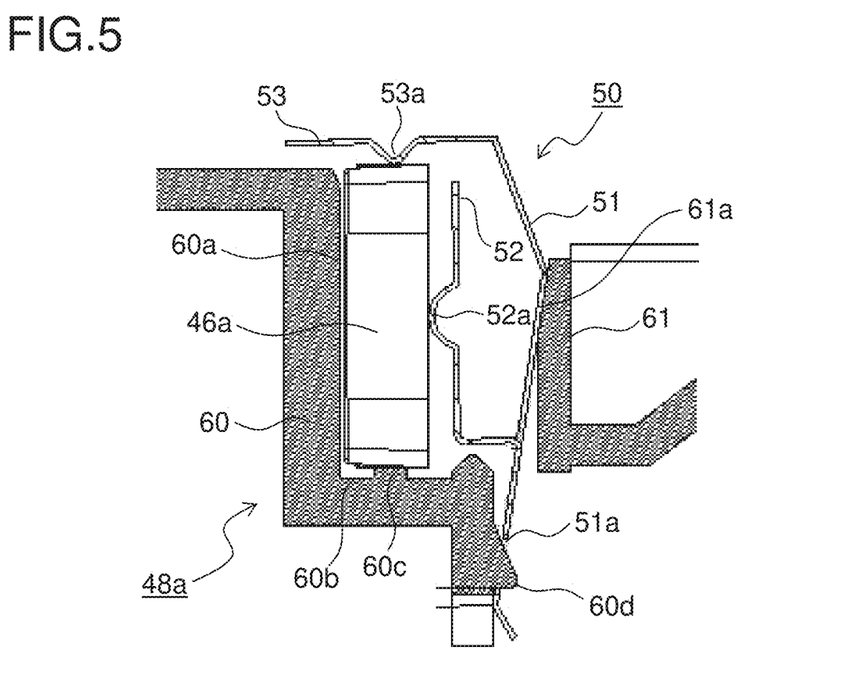
FIG. 5 is a partial sectional view of a vicinity of a lens retaining portion in the housing of the optical scanner of the first embodiment, illustrating a state where the first scanning lens is pressed and retained by the pressing spring.

FIG. 5 is a partial sectional view of a vicinity of the lens retaining portion 60 in the housing 48. While FIG. 5 shows a structure for retaining the first scanning lens 46a on one side in a longitudinal direction thereof, a similar structure thereto is provided also on the other side of the first scanning lens 46a in the longitudinal direction.

As shown in FIG. 5, the lens retaining portion 60 is provided in a main body 48a (see FIG. 3) of the housing 48. The lens retaining portion 60 has an L shape as viewed sideways and includes a first retaining surface 60a opposed to a light incidence surface (a left side surface in FIG. 5) of the first scanning lens 46a and a second retaining surface 60b opposed to a lower surface of the first scanning lens 46a. The second retaining surface 60b has a protrusion 60c formed thereon. The engaged portion 60d is formed below the second retaining surface 60b.

The spring support portion 61 is provided in the main body 48a. The spring support portion 61 is opposed at a prescribed distance to the first retaining surface 60a of the lens retaining portion 60. The spring support portion 61 has an inclined surface 61a formed at an upper part thereof.

The pressing spring 50 is inserted between a light emission surface (a right side surface in FIG. 5) of the first scanning lens 46a and the spring support portion 61. An engaging hole 51a of the pressing spring 50 engages with the engaged portion 60d, and thus positioning of the pressing spring 50 with respect to the main body 48a is achieved (a first state). The first pressing portion 52 is in contact at the first pressure contact point 52a with the light emission surface of the first scanning lens 46a. The second pressing portion 53 is in contact at the second pressure contact point 53a with an upper surface of the first scanning lens 46a.

That is, by a biasing force of the first pressing portion 52 of the pressing spring 50, the light incidence surface (the left side surface in FIG. 5) of the first scanning lens 46a is pressed against the first retaining surface 60a. Furthermore, by a biasing force of the second pressing portion 53 of the pressing spring 50, the lower surface of the first scanning lens 46a is pressed against the protrusion 60c of the second retaining surface 60b.

According to this configuration, by use of the single pressing spring 50, the first scanning lens 46a can be retained to the first retaining surface 60a and the second retaining surface 60b of the lens retaining portion 60. Accordingly, without the need to increase the number of pressing springs 50 used, the first scanning lens 46a can be retained stably.

Figure 6:
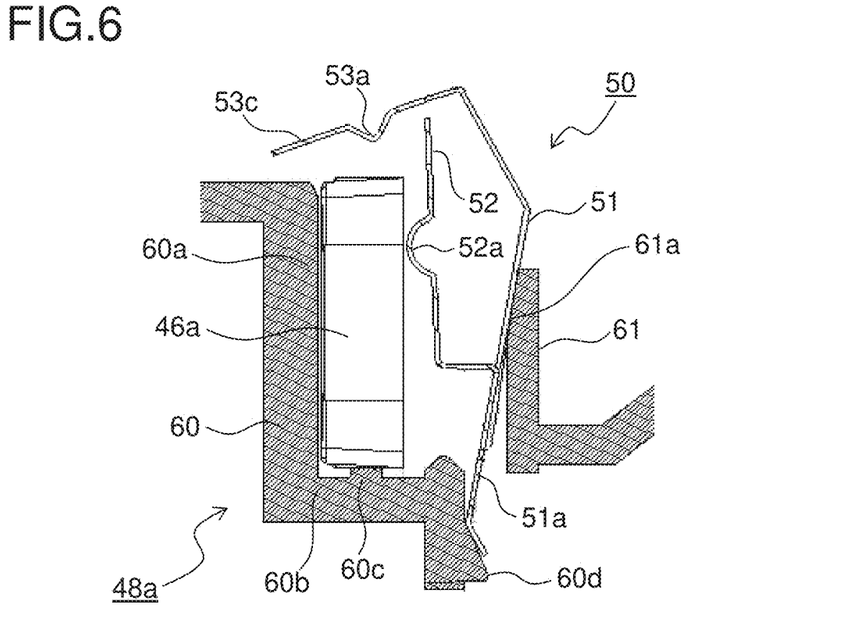
FIG. 6 is a partial sectional view of the vicinity of the lens retaining portion in the housing of the optical scanner of the first embodiment, illustrating a state where the pressing spring is inserted between the first scanning lens and a spring support portion.

Next, a description is given of a method for securing the first scanning lens 46a by using the pressing spring 50 in the optical scanner 5 of the first embodiment. FIG. 6 is a partial sectional view of the vicinity of the lens retaining portion 60 in the housing 48 of the optical scanner 5 of the first embodiment, illustrating a state where the pressing spring 50 is inserted between the first scanning lens 46a and the spring support portion 61.

In a case of securing the first scanning lens 46a by using the pressing spring 50, first, as shown in FIG. 6, the light incidence surface and the lower surface of the first scanning lens 46a are brought into contact with the first retaining surface 60a and the second retaining surface 60b (the protrusion 60c) of the lens retaining portion 60, respectively. As the pressing spring 50 is inserted, in this state, from above between the first scanning lens 46a and the spring support portion 61, the spring main body 51 of the pressing spring 50 slides downward along the inclined surface 61a of the spring support portion 61. Furthermore, the first pressure contact point 52a of the first pressing portion 52 contacts the light emission surface of the first scanning lens 46a.

Thus, by the biasing force of the first pressing portion 52, the first scanning lens 46a is brought into pressure contact with the first retaining surface 60a. At this time, the second pressing portion 53 is not in contact with the upper surface of the first scanning lens 46a. Furthermore, the engaging hole 51a of the spring main body 51 is not engaged with the engaged portion 60d of the lens retaining portion 60 (a second state).

Figure 7:
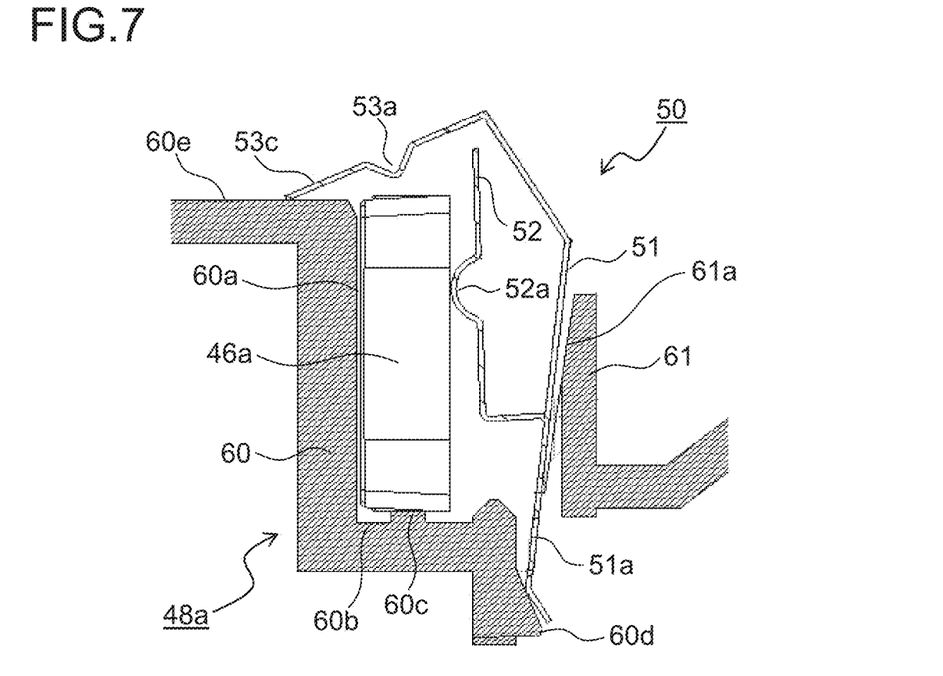
FIG. 7 is a view showing a state where the pressing spring is inserted further downward from the state shown in FIG. 6.

As the pressing spring 50 is inserted further downward from the state shown in FIG. 6, as shown in FIG. 7, a distal end of the extension 53c of the second pressing portion 53 contacts an upper surface 60e of the lens retaining portion 60. At this time, the second pressure contact point 53a of the second pressing portion 53 is not in contact with the upper surface of the first scanning lens 46a.

Figure 8:
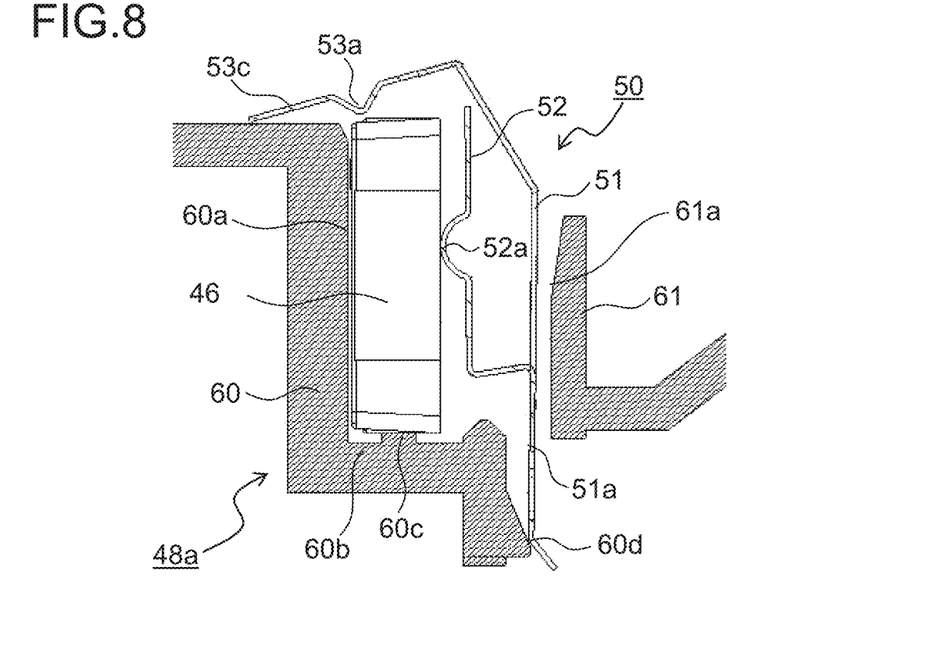
FIG. 8 is a view showing a state where the pressing spring is inserted further downward from the state shown in FIG. 7.

As the pressing spring 50 is inserted further downward from a state shown in FIG. 7, as shown in FIG. 8, the second pressure contact point 53a of the second pressing portion 53 contacts the upper surface of the first scanning lens 46a. Thus, by the biasing force of the second pressing portion 53, the first scanning lens 46a is brought into pressure contact with the second retaining surface 60b (the protrusion 60c).

As the pressing spring 50 is inserted further downward from a state shown in FIG. 8, the engaging hole 51a formed at the lower end of the spring main body 51 engages with the engaged portion 60d of the lens retaining portion 60, and there is brought about a state (the first state) shown in FIG. 5 where the first scanning lens 46a is pressed and retained to the lens retaining portion 60 by the pressing spring 50.

In this embodiment, when the pressing spring 50 is inserted between the lens retaining portion 60 and the spring support portion 61, before the second pressure contact point 53a of the second pressing portion 53 abuts on the upper surface of the first scanning lens 46a, the extension 53c abuts on the upper surface 60e of the lens retaining portion 60. Thus, in retaining the first scanning lens 46a to the lens retaining portion 60 by using the pressing spring 50, the second pressure contact point 53a and the extension 53c of the second pressing portion 53 can be prevented from entering a gap between the first retaining surface 60a of the lens retaining portion 60 and the first scanning lens 46a. Accordingly, there is no possibility that cracking or chipping occurs at an edge (a corner) of the first scanning lens 46a or that the first scanning lens 46a is disposed in an inclined manner.

Furthermore, in a case where the first retaining surface 60a of the lens retaining portion 60 is substantially perpendicular as in this embodiment, from the viewpoint of preventing the second pressing portion 53 from entering the gap between the first retaining surface 60a and the first scanning lens 46a, it is difficult in terms of a mold structure to form a projection projecting from the first retaining surface 60a. It is, therefore, particularly effective to adopt a relationship between the pressing spring 50 and the lens retaining portion 60 in the configuration of this embodiment.

Figure 9:
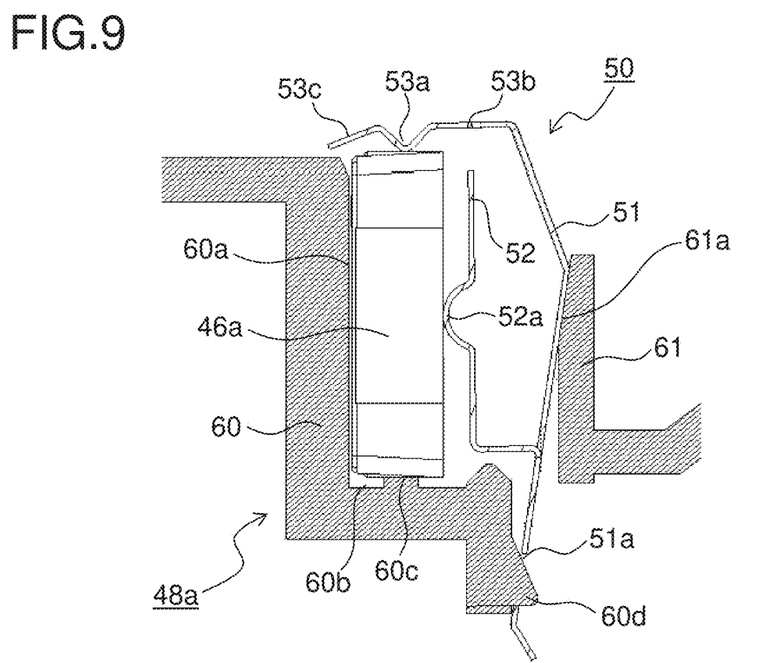
FIG. 9 is a partial sectional view of a vicinity of a lens retaining portion in a housing of an optical scanner according to a second embodiment of the present disclosure, illustrating a state where a first scanning lens is pressed and retained by a pressing spring.

FIG. 9 is a partial sectional view of a vicinity of a lens retaining portion 60 in a housing 48 of an optical scanner 5 according to a second embodiment of the present disclosure, illustrating a state where a first scanning lens 46a is pressed and retained by a pressing spring 50. In this embodiment, a second pressing portion 53 of the pressing spring 50 is configured differently from that in the first embodiment. To be more specific, a proximal end 53b and an extension 53c of the second pressing portion 53 are not flush with each other, and the extension 53c is bent in a direction toward an upper surface 60e of the lens retaining portion 60. Other portions of the pressing spring 50 are configured similarly to those in the first embodiment.

Figure 10:
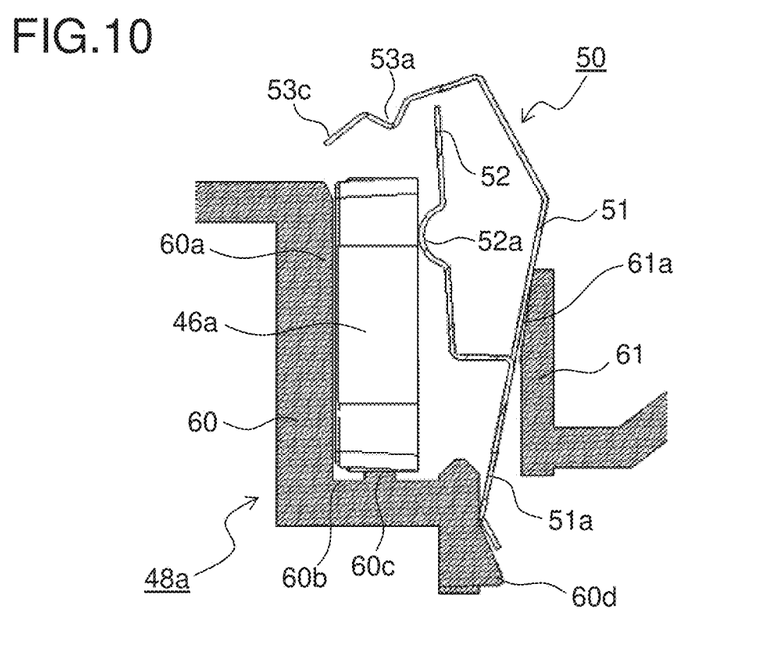
FIG. 10 is a partial sectional view of the vicinity of the lens retaining portion in the housing of the optical scanner of the second embodiment, illustrating a state where the pressing spring is inserted between the first scanning lens and a spring support portion.

Next, a description is given of a method for securing the first scanning lens 46a by using the pressing spring 50 in the optical scanner 5 of the second embodiment. FIG. 10 is a partial sectional view of the vicinity of the lens retaining portion 60 in the housing 48 of the optical scanner 5 of the second embodiment, illustrating a state where the pressing spring 50 is inserted between the first scanning lens 46a and a spring support portion 61.

In a case of securing the first scanning lens 46a by using the pressing spring 50, first, as shown in FIG. 10, a light incidence surface and a lower surface of the first scanning lens 46a are brought into contact with a first retaining surface 60a and a second retaining surface 60b (a protrusion 60c) of the lens retaining portion 60, respectively. As the pressing spring 50 is inserted, in this state, from above between the first scanning lens 46a and the spring support portion 61, a spring main body 51 of the pressing spring 50 slides downward along an inclined surface 61a of the spring support portion 61. Furthermore, a first pressure contact point 52a of a first pressing portion 52 contacts a light emission surface of the first scanning lens 46a.

Thus, by a biasing force of the first pressing portion 52, the first scanning lens 46a is brought into pressure contact with the first retaining surface 60a. At this time, the second pressing portion 53 is not in contact with an upper surface of the first scanning lens 46a. Furthermore, an engaging hole 51a of the spring main body 51 is not engaged with an engaged portion 60d of the lens retaining portion 60 (a second state).

Figure 11:
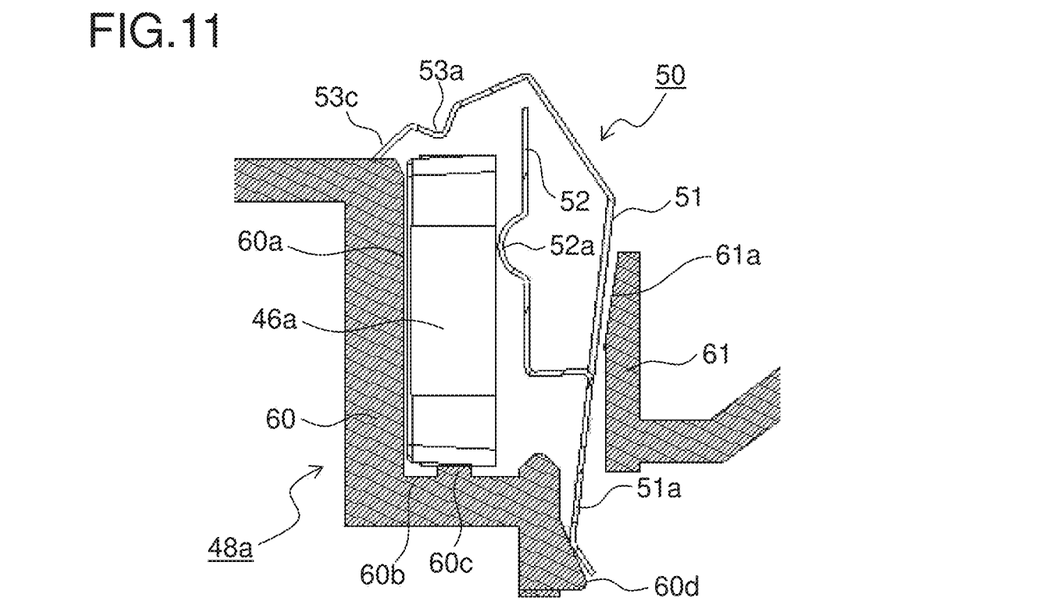
FIG. 11 is a view showing a state where the pressing spring is inserted further downward from the state shown in FIG. 10.

As the pressing spring 50 is inserted further downward from the state shown in FIG. 10, as shown in FIG. 11, a distal end of the extension 53c of the second pressing portion 53 contacts the upper surface 60e of the lens retaining portion 60. At this time, a second pressure contact point 53a of the second pressing portion 53 is not in contact with the upper surface of the first scanning lens 46a.

Figure 12:
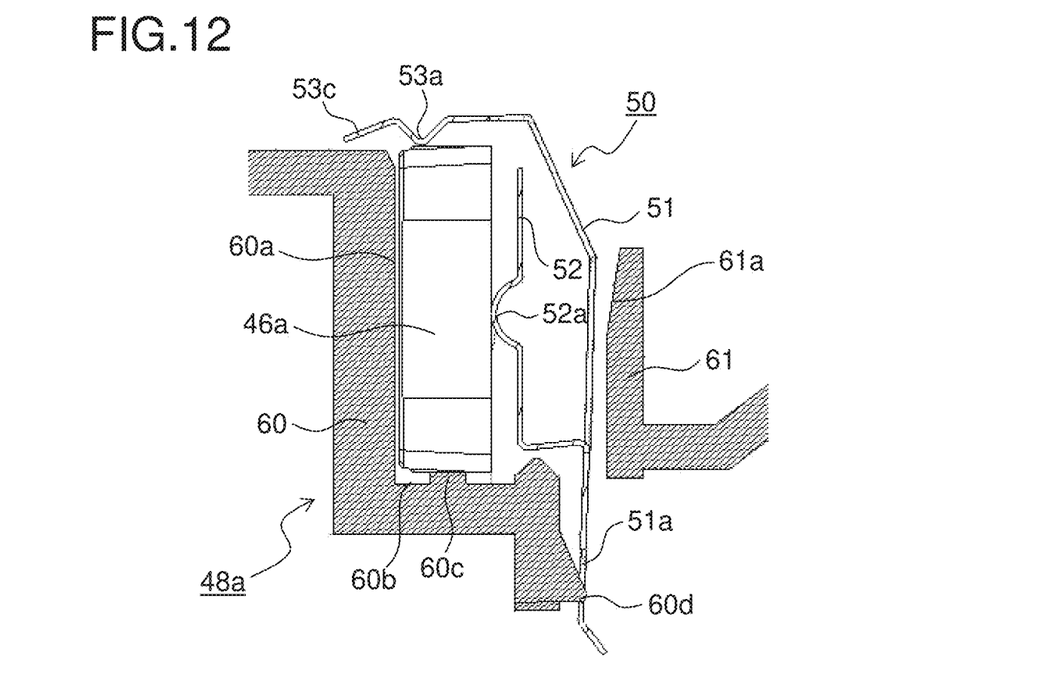
FIG. 12 is a view showing a state where the pressing spring is inserted further downward from the state shown in FIG. 11.

As the pressing spring 50 is inserted further downward from a state shown in FIG. 11, as shown in FIG. 12, the second pressure contact point 53a of the second pressing portion 53 contacts the upper surface of the first scanning lens 46a. Thus, by a biasing force of the second pressing portion 53, the first scanning lens 46a is brought into pressure contact with the second retaining surface 60b (the protrusion 60c).

As the pressing spring 50 is inserted further downward from a state shown in FIG. 12, the engaging hole 51a formed at a lower end of the spring main body 51 engages with the engaged portion 60d of the lens retaining portion 60, and there is brought about the state (the first state) shown in FIG. 9 where the first scanning lens 46a is pressed and retained to the lens retaining portion 60 by the pressing spring 50.

Also in this embodiment, similarly to the first embodiment, when the pressing spring 50 is inserted between the lens retaining portion 60 and the spring support portion 61, before the second pressure contact point 53a of the second pressing portion 53 abuts on the upper surface of the first scanning lens 46a, the extension 53c abuts on the upper surface 60c of the lens retaining portion 60. Thus, the second pressure contact point 53a and the extension 53c of the second pressing portion 53 can be prevented from entering a gap between the first retaining surface 60a of the lens retaining portion 60 and the first scanning lens 46a. Accordingly, there is no possibility that cracking or chipping occurs at an edge (a corner) of the first scanning lens 46a or that the first scanning lens 46a is disposed in an inclined manner.

Furthermore, since the extension 53c is bent in the direction toward the upper surface 60e of the lens retaining portion 60, when the pressing spring 50 is inserted between the lens retaining portion 60 and the spring support portion 61, the distal end of the extension 53c is likely to contact the upper surface 60e of the lens retaining portion 60. This makes it possible to shorten the extension 53c compared with that in the first embodiment.

In addition, the present disclosure is not limited to the foregoing embodiments and can be variously modified without departing from the spirit of the present disclosure. For example, while the foregoing embodiments have described a configuration in which the first scanning lens 46a is pressed and retained by the pressing spring 50, an optical element pressed and retained by the pressing spring 50 is not limited to the first scanning lens 46a and may also be each of the second scanning lenses 47a to 47d or each of the plane mirrors 49a to 49c. In a case where each of the plane mirrors 49a to 49c is pressed and retained by the pressing spring 50, it is possible to effectively suppress cracking or chipping that might occur at an edge (a corner) of the each of the plane mirrors 49a to 49c due to contact by the second pressing portion 53.

Furthermore, a configuration of disposing the components constituting the scanning optical system in the housing 48 is not limited to that shown in FIG. 3 and may also be, for example, a configuration in which the polygon mirror 45 is disposed substantially at a center of the housing 48, and one of two first scanning lenses 46a and the second scanning lenses 47a and 47b are disposed to be opposed to the other of the two first scanning lenses 46a and the second scanning lenses 47c and 47d via the polygon mirror 45.

Furthermore, while the foregoing description uses a tandem color printer as an example of the image forming apparatus 100 in which the optical scanner 5 is mounted, the present disclosure is not limited to the color printer and is applicable also to an electrophotographic color image forming apparatus such as a color copy machine or a facsimile or an electrophotographic monochrome image forming apparatus such as a monochrome printer or a monochrome multi-functional peripheral.

The present disclosure is usable in an optical scanner that forms a latent image on a scanning target surface by exposure scanning. Through the use of the present disclosure, it is possible to provide an optical scanner capable of preventing an optical element retained by using a pressing and retaining member from being subjected to cracking or chipping or from being disposed in an inclined manner irrespective of an angle at which the optical element is installed, and an image forming apparatus including the same.

What is claimed is:
1. An optical scanner. comprising:
a scanning optical system that scans a light beam and quides the light beam onto an image carrier:
a housing including a retaining portion that retains an optical element as a component of the scanning optical system; and
a pressing and retaining member that presses the optical element so as to retain the optical element to the retaining portion,
the optical scanner exposing to light a surface of the image carrier so as to form thereon an electrostatic latent image with attenuated electrostatic charge, wherein
the pressing and retaining member includes:
 a main body; and
 at least one pressing portion that is connected to the main body and presses the optical element retained to the retaining portion toward the retaining portion
the housing includes:
 a support portion that is formed to be opposed to the retaining portion and supports the main body; and
 an engaged portion to be engaged with an engaging portion formed in the main body,
in a first state where the pressing and retaining member is inserted between the retaining portion and the support portion so that the engaging portion is engaged with the engaged portion, the at least one pressing portion presses the optical element toward the retaining portion,
while the pressing and retaining member shifts from a second state where the engaging portion is not engaged with the engaged portion to the first state, a distal end of the at least one pressing portion passes beyond a boundary between the retaining portion and the optical element and abuts on a part of the housing,
the at least one pressing portion includes:

a pressure contact point that makes a point contact or a linear contact with the optical element in the first state;
a proximal end that extends in a direction directed to the main body from the pressure contact point; and
an extension that extends in an opposite direction to the main body from the pressure contact point,
while the pressing and retaining member shifts from the second state to the first state, after the extension has passed beyond the boundary between the retaining portion and the optical element and abutted on the part of the housing, the pressure contact point makes a point contact or a linear contact with the optical element retained to the retaining portion,
the retaining portion has an L shape as viewed sideways, including:
a first retaining surface opposed to a side surface of the optical element; and
a second retaining surface opposed to a lower surface of the optical element,
the pressing and retaining member includes, as the at least one pressing portion:
a first pressing portion that presses the optical element toward the first retaining surface; and
a second pressing portion that presses the optical element toward the second retaining surface, and
the pressure contact point, the proximal end, and the extension are formed in the second pressing portion.

2. The optical scanner according to claim 1, wherein the extension is parallel to the proximal end or bent in a direction toward the retaining portion.

3. The optical scanner according to claim 1, wherein by the first pressing portion, the optical element is pressed and retained to the first retaining surface, which is substantially perpendicular.

4. The optical scanner according to claim 1, wherein the first pressing portion is bent from the main body at a first bent part and is further bent at a second bent part in a direction inverse to a direction of bending at the first bent part, thus being formed in an L shape as viewed sideways,
the second pressing portion is bent from the main body at a third bent part at an upper end of the main body in a same direction as an extending direction of the first pressing portion, and
the main body has a slit that is formed by cutting and raising the first pressing portion from the main body and extends from the first bent part to the second pressing portion via the third bent part.

5. An image forming apparatus, comprising:
one or more image carriers each having a surface on which a photosensitive layer is formed;
a charging device that charges each of the one or more image carriers to a prescribed surface potential; and
the optical scanner according to claim 1, which exposes to light the surface of the each of the one or more image carriers charged by the charging device so as to form thereon an electrostatic latent image with attenuated electrostatic charge.

* * * * *